(12) United States Patent
Dow et al.

(10) Patent No.: US 7,076,913 B1
(45) Date of Patent: Jul. 18, 2006

(54) INFRARED SENSING FOR LOCATING AND AIDING DESTRUCTION OF MOLES

(76) Inventors: C. Thomas Dow, 1115 D. Lowes Creek Rd., Eau Claire, WI (US) 54701; Jerome E. Johnson, Jr., 8425 720th Ave., Elk Mound, WI (US) 54739; Michael Cropp, N. 6643 250th St., Menomonie, WI (US) 54751; Michael Miller, 519 8th Ave. East, Durand, WI (US) 54736; James M. Przybelski, 2335 Hay Creek Trail, Red Wing, MN (US) 55066

( * ) Notice: Subject to any disclaimer, the term of this patent is extended or adjusted under 35 U.S.C. 154(b) by 0 days.

(21) Appl. No.: 11/148,636

(22) Filed: Jun. 9, 2005

Related U.S. Application Data

(63) Continuation-in-part of application No. 10/819,670, filed on Apr. 7, 2004, now abandoned.

(60) Provisional application No. 60/460,778, filed on Apr. 7, 2003.

(51) Int. Cl.
*A01M 23/36* (2006.01)

(52) U.S. Cl. .................................. 43/80; 43/77; 43/79

(58) Field of Classification Search ............... 43/77–80
See application file for complete search history.

(56) References Cited

U.S. PATENT DOCUMENTS

| | | | | | |
|---|---|---|---|---|---|
| 78,128 | A | * | 5/1868 | Polley | 43/80 |
| 119,354 | A | * | 9/1871 | Hardwick | 43/80 |
| 150,432 | A | * | 5/1874 | Reed | 43/80 |
| 210,040 | A | * | 11/1878 | Isbell | 43/80 |
| 238,583 | A | * | 3/1881 | Hales | 43/80 |
| 242,208 | A | * | 5/1881 | Mabbett, Jr. | 43/80 |
| 374,135 | A | * | 11/1887 | Wood | 43/80 |
| 374,765 | A | * | 12/1887 | Waltman | 43/80 |
| 393,048 | A | * | 11/1888 | Wherry | 43/80 |
| 449,011 | A | * | 3/1891 | Syverud | 43/80 |
| 517,824 | A | * | 4/1894 | Parham | 43/80 |
| 524,216 | A | * | 8/1894 | Reddick | 43/80 |
| 540,475 | A | * | 6/1895 | Wherry | 43/80 |
| 563,310 | A | * | 7/1896 | Reger et al. | 43/80 |
| 593,933 | A | * | 11/1897 | Guertin | 43/80 |
| 666,212 | A | * | 1/1901 | Simmons | 43/80 |
| 670,757 | A | * | 3/1901 | Barnes | 43/80 |
| 674,551 | A | * | 5/1901 | Carlsen | 43/79 |
| 689,324 | A | * | 12/1901 | Rittenhouse | 43/80 |
| 695,905 | A | * | 3/1902 | Brown | 43/80 |
| 767,220 | A | * | 8/1904 | Graeber | 43/80 |
| 788,076 | A | * | 4/1905 | Swope | 43/80 |
| 820,686 | A | * | 5/1906 | Walker | 43/80 |
| 861,174 | A | * | 7/1907 | Heil | 43/80 |
| 954,996 | A | * | 4/1910 | Renken | 43/79 |

(Continued)

FOREIGN PATENT DOCUMENTS

DE        2533096 A   *   2/1977

(Continued)

*Primary Examiner*—Darren W. Ark
(74) *Attorney, Agent, or Firm*—Tipton L. Randall

(57) ABSTRACT

A system for detecting and eliminating subterranean animals is disclosed. The system includes an infrared detector device adapted to detect animals below the ground surface from above the ground surface. A lethal event device is operatively coupled to the infrared detector device. An animal below the ground surface passing the above ground infrared detector actuates the lethal event device to eliminate the animal below the ground surface. A method for detecting subterranean animals is disclosed, as well as a method for detecting and eliminating subterranean animals.

15 Claims, 12 Drawing Sheets

U.S. PATENT DOCUMENTS

| | | | | |
|---|---|---|---|---|
| 964,877 | A * | 7/1910 | Nepean-Hutchison | 43/80 |
| 986,254 | A * | 3/1911 | Whitney | 43/80 |
| 993,192 | A * | 5/1911 | Ostertag | 43/80 |
| 1,025,564 | A * | 5/1912 | Eldridge | 43/80 |
| 1,031,229 | A * | 7/1912 | Barker | 43/80 |
| 1,059,006 | A * | 4/1913 | Scott | 43/80 |
| 1,132,697 | A * | 3/1915 | Uhlrig | 43/80 |
| 1,231,390 | A * | 6/1917 | Lantis | 43/79 |
| 1,330,622 | A * | 2/1920 | Corsaw | 43/80 |
| 1,334,418 | A * | 3/1920 | Tabor | 43/79 |
| 1,382,125 | A * | 6/1921 | Schroeter | 43/80 |
| 1,706,541 | A * | 3/1929 | Prokop | 43/79 |
| 1,918,582 | A * | 7/1933 | Alvau | 43/80 |
| 2,086,826 | A * | 7/1937 | Smith | 43/80 |
| 2,149,311 | A * | 3/1939 | Potts | 43/79 |
| 2,475,467 | A * | 7/1949 | Alvan | 43/80 |
| 2,589,385 | A * | 3/1952 | Howrey | 43/80 |
| 2,778,148 | A * | 1/1957 | Schmidt | 43/80 |
| 3,013,358 | A * | 12/1961 | Wilken | 43/80 |
| 3,815,278 | A * | 6/1974 | Beaton et al. | 43/99 |
| 4,048,746 | A | 9/1977 | Dye | |
| 4,187,634 | A | 2/1980 | Kintz | |
| 4,213,265 | A | 7/1980 | Denninger et al. | |
| 4,494,335 | A * | 1/1985 | Gaines | 43/80 |
| 4,497,130 | A | 2/1985 | Fitzgerald | |
| 4,541,199 | A * | 9/1985 | Reidinger, Jr. | 43/131 |
| 4,596,087 | A * | 6/1986 | Pratscher | 43/79 |
| 4,612,724 | A * | 9/1986 | Alboainin | 43/79 |
| 4,653,221 | A * | 3/1987 | Pratscher | 43/79 |
| 4,765,087 | A | 8/1988 | Holtgrefe, Sr. | |
| 4,776,128 | A * | 10/1988 | Townsend | 43/80 |
| 4,780,985 | A | 11/1988 | Coots | |
| 5,307,587 | A | 5/1994 | Zeiger et al. | |
| 5,603,287 | A | 2/1997 | Houck | |
| 5,832,657 | A * | 11/1998 | Jan | 43/124 |
| 5,915,332 | A | 6/1999 | Young et al. | |
| 5,918,409 | A | 7/1999 | Carnwath | |
| 5,949,636 | A | 9/1999 | Johnson et al. | |
| 6,802,152 | B1 * | 10/2004 | Hagen et al. | 43/79 |
| 6,807,767 | B1 * | 10/2004 | Schade | 43/77 |
| 2002/0167409 | A1 * | 11/2002 | Cristofori et al. | 43/58 |

FOREIGN PATENT DOCUMENTS

| | | | |
|---|---|---|---|
| DE | 19954142 A1 * | 5/2001 | |
| FR | 2598060 A1 * | 11/1987 | |
| FR | 2856890 A1 * | 1/2005 | |
| JP | 11-206304 A * | 8/1999 | |
| JP | 2002-112689 A * | 4/2002 | |
| JP | 2002-330687 A * | 11/2002 | |
| JP | 2003-325092 A * | 11/2003 | |
| JP | 2005-95010 A * | 4/2005 | |

* cited by examiner

INFRARED SENSING FOR LOCATING AND AIDING DESTRUCTION OF MOLES

CROSS-REFERENCE TO RELATED APPLICATIONS, IF ANY

This application is a continuation-in-part of utility application Ser. No. 10/819,670, filed 7 Apr., 2004 now abandoned. Application Ser. No. 10/819,670 is hereby incorporated by reference. This application also claims the benefit under 35 U.S.C. § 119 (e) of provisional application Ser. No. 60/460,778, filed 7 Apr., 2003. Application Ser. No. 60/460,778 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to a method and a device for detecting subterranean animals, and more particularly, to a system for detecting and destroying subterranean animals.

2. Background Information

The state of the art includes various methods and devices for detecting and destroying various subterranean and surface dwelling animals. This technology is believed to have significant limitations and shortcomings, including but not limited to that the devices are marginally effective and costly to manufacture.

For this and other reasons, a need exists for the present invention. This invention provides a simple system and method for detecting and destroying various subterranean and surface dwelling animals, which is believed to fulfill the need and to constitute an improvement over the background technology.

All United States patents and patent applications, and all other published documents mentioned anywhere in this application are incorporated by reference in their entirety. Some examples of devices for detecting and eliminating or destroying various subterranean and surface dwelling animals for which patents have been granted include the following.

Dye, in U.S. Pat. No. 4,048,746, describes an electronic rodent exterminator that is inserted into the rodent's burrows without removal of soil. The device includes a stick-type carrier for insertion, a metal sleeve which is installed on the tip of the carrier constituting an electric ground, and two brass rings secured on the stick-type carrier, serving as a sense control and high voltage electrodes. The device includes a circuit connected to the metal sleeve and the two brass rings to test the location of a burrow and provide high voltage and current. The circuit is also provided with a light which gives a continuously visible alarm indicating that a rodent has been electrocuted.

In U.S. Pat. No. 4,187,634, Kintz discloses an animal trap for capturing burrowing animals. The trap includes an upper roof portion and a grill-like floor portion to allow the trap to be embedded in the earthen floor of the tunnel of an animal. Spring loaded gates close when an animal enters the trap and steps on the trigger plate.

Denninger et al., in U.S. Pat. No. 4,213,265, describe an explosive trap for moles. The device includes an envelope with the pyrotechnic charge that is placed in the mole run. Electronic triggers extend from the charge in both directions in the mole run. When the mole contacts one trigger, the charge detonates and kills the mole.

In U.S. Pat. No. 4,494,335, Gaines discloses an "automatic set" mole trap that is positioned over the mole tunnel. A spring loaded fork is propelled into the tunnel from above when a mole passes through and trips the trigger.

Fitzgerald, in U.S. Pat. No. 4,497,130 discloses a rodent trap with a plastic housing, which contains an electrical mechanism that electrocutes an entering rodent. The exterior of the trap is shown with various shapes. The electronics includes two contacts in a circuit with a circuit breaker and a power source.

In U.S. Pat. No. 4,765,087, Holtgrefe, Sr., discloses a mechanical mole trap, having a pair of spring-loaded jaws. A platform is pivotally connected to the jaws to limit the travel of the trap into the ground and to stabilize the trap on the ground when it is set. A lever assembly forces the jaws open and sets the trap when the lever reaches an off-center position. The vibration of a mole traveling beneath the trigger causes the lever assembly to move upward from the off-center position and the jaws to close and destroy the animal.

U.S. Pat. No. 4,776,128 by Townsend provides an over-the-hole mole trap which is triggered when a mole ejects dirt from the hole. The trap includes a frame, a spear, a spring, a trigger lever and a trigger plate. The frame supports the spear, with the spring surrounding the spear.

Coots, in U.S. Pat. No. 4,780,985, describes an electronic mouse exterminator, including a box with electrical wires at opposite sides of an entry opening. The box has a hinged top for providing power to the wires with the top closed and permitting easy removal of an exterminated rodent. The box has air vents to permit the aroma of bait to permeate external to the box.

In U.S. Pat. No. 5,307,587, Zeiger et al. disclose another mole trap with pairs of spring biased, opposed jaws and a trigger. The device is placed in a mole run to trap the mole as it moves between one of the pairs of opposed jaws.

U.S. Pat. No. 5,603,287 by Houck describes an animal sensing and repelling system containing an infrared motion detector which detects any warm moving object. Once detection has occurred, a radio frequency (R.F.) pulse signal is transmitted by a radio transmitter/receiver to the involved area. A family pet with a transmitter collar then signals the device, and the repelling subsystem, which is a flood light and a water spray, is deactivated. If a signal is not received, the repelling system is activated to scare away unwanted animals. The R.F. unit can operate alone to sense animals.

Young et al., in U.S. Pat. No. 5,915,332, disclose a system for detecting animal motion and activity. The animal confining structure is fitted with multiple arrays of infrared sensors for monitoring the position and motion of a confined animal. The arrays of sensors are connected to a computer for accumulating data on the movements of the confined animal.

U.S. Pat. No. 5,918,409 by Carnwath describes a self clearing, tunnel rat trap that is electrically powered and kills by electrocution. The animal trips two triggers, such as infrared beams, when in the trap, which triggers electrocution of the animal. A mechanical system is present that removes the dead animal from the trap and prepares the trap for further use.

Johnson et al., in U.S. Pat. No. 5,949,636, describe a portable pest electrocution device with a resistive switch trigger. The device employs a resistive switch that uses the same electrodes to sense the presence of a pest and to electrocute the pest. The electrodes are positioned in a small container that is inserted into the burrow of an animal. The device is battery powered and requires turning the power off and on to reset the system.

SUMMARY OF THE INVENTION

The invention is directed to a method and apparatus for detecting subterranean animals, particularly moles, based upon heat sensing, infrared technology. Although the use of infrared detection for locating downed game animals is known, this detection method has not been applied to the detection of subterranean animals, most particularly moles, in their underground runs.

Since the only current effective way of dealing with many subterranean animals, such as moles, is to trap them, the invention is the use of infrared heat sensing to direct the trapping of subterranean animals, including moles. The infrared heat sensing device is operatively associated with a suitable lethal event device. Detection of a subterranean animal triggers a terminating, lethal event for the detected animal, such as a mole. Two such devices are contemplated in combination to form a suitable detection and lethal event system. Such a system is employed for carrying out the method of the present invention.

The invention also includes a method of detecting and eliminating subterranean animals. The method includes providing a heat sensing, infrared detector device adapted for detecting an animal below the ground surface from above the ground surface. A lethal event device is provided that is operatively coupled to the heat sensing, infrared detector device. An animal passing below ground is detected with the above ground infrared detector, and the lethal event device is actuated by the infrared detector device to destroy the animal below ground.

In a preferred embodiment of the invention, a system for detecting and destroying subterranean animals includes a heat sensing, infrared detector device adapted to detect animals below a ground surface from above the ground surface. A lethal event device is positioned above the ground surface and operatively coupled to the heat sensing, infrared detector device. The lethal event device includes a plurality of linear spike members adapted to penetrate the ground surface. An animal below ground, passing the above ground, heat sensing, infrared detector element, actuates the lethal event device, thereby causing the plurality of linear spike members to penetrate the ground surface to destroy the animal there beneath.

DESCRIPTION OF THE EMBODIMENTS

Figure 1:
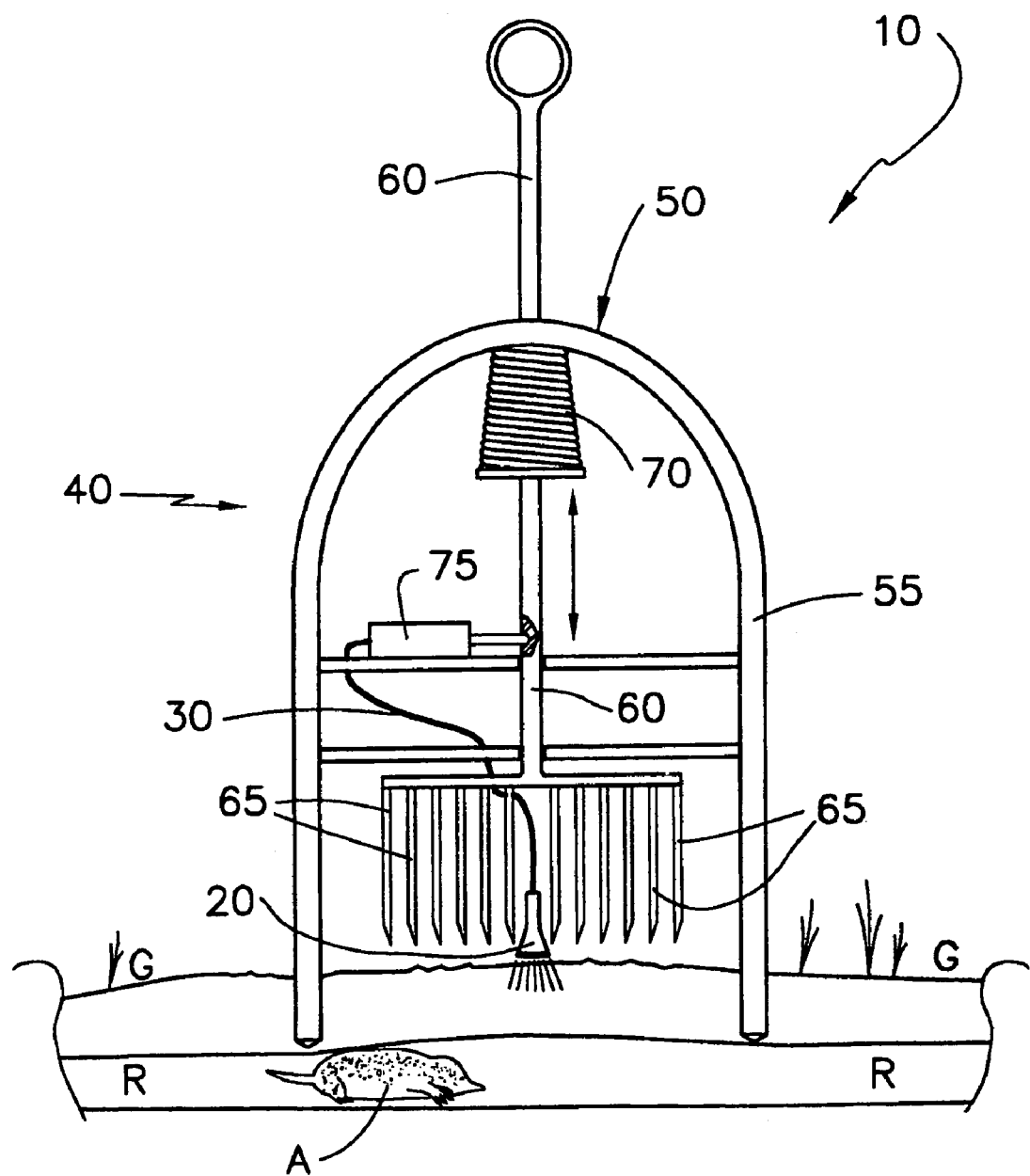
FIG. 1 is a sectional view of one embodiment of the assembly of a lethal event device operatively coupled to an infrared detector device of the present invention.

Nomenclature
10 Detector/Lethal Event System
20 Heat Sensing Infrared Detector Device
30 Control Line
40 Lethal Event Device
50 Spring-Loaded Mechanical Lethal Event Device
55 Framework Member
60 Slidable Rod Member
65 Spike Members
70 Biasing Spring Member
75 Trigger Member
100 Electrically Powered Detector/Lethal Event System
110 Planar Base Member
112 Upright Supports of Base Member
115 Apertures for Spike Members
120 Linear Spike Members
122 Pointed End of Spike Member
123 Connector End of Spike Member
125 Mechanical Linkage
127 First End of Mechanical Linkage
128 Second End of Mechanical Linkage
130 Solenoid Member
135 Power Source Battery Member
140 Shroud Member
142 Access Cover of Shroud Member
145 Anchor Members
150 Central Aperture in Base Member
155 Heat Sensor Portion of Detector Device
160 Control Module of Detector/Lethal Event System
165 Conductor Cable of Detector Device
170 Electronics Circuitry of Detector/Lethal Event System
180 Series of Relay Members
K185 Detector Circuit Relay Member
K190 Audio Circuit Relay Member
K195 Solenoid Circuit Relay Member K200 Light Circuit Relay Member
K205 Counter Circuit Relay Member
K210 Remote Control Circuit Relay Member
S1 Switch Member for Audio Circuit
S2 Switch Member for Solenoid Circuit
S3 Switch Member for Light Circuit
S4 Switch Member for Counting Circuit
225 Audio Circuit
230 Solenoid Remote Control Circuit
240 Light Circuit
250 Counting Circuit
A Subterranean Animal
G Ground Level
R Underground Run Construction The invention is directed to an apparatus and a method for detecting and destroying subterranean animals, particularly moles, based upon infrared technology. Although the use of infrared detection for locating downed game animals is known, this detection method has not been applied to the detection of subterranean animals and, particularly, moles in their underground runs.

The concept was tested by use of a handheld infrared, heat sensing unit. To simulate a subterranean animal, such as a mole, within a run, a bag of heated intravenous solution was pulled through the run while holding the heat sensing, infrared detector over the run. The infrared heat detector consistently detected the simulated subterranean animal, such as a mole, passing in the run. The run was about 1.0–1.5 inches below the ground surface at the measuring point. Since the only current effective way of dealing with many subterranean animals, such as moles, is to trap them, the invention is the use of infrared heat sensing to direct the trapping of subterranean animals, including moles. The infrared heat sensing device is operatively associated with a suitable lethal device. Detection of a subterranean animal triggers a terminating, lethal event for the detected animal, such as a mole. The term "lethal event" is defined as the killing of such a detected animal. Several devices are contemplated in combination to form a suitable detection and lethal event system. Such a system is employed for carrying out the method of the present invention. Several examples of such detection and lethal event systems included in the following description. The devices and methods are described in the context of detecting and eliminating a mole, although various other subterranean animals can be detected and destroyed with such systems.

Detecta-Mole—This device is configured similar to a weed whip, with an infrared heat sensor in the cone on the ground end and a monitor at the handle end. The cone device is moved along the run until a mole is detected.

Counta-Mole—This device includes an infrared heat sensor in a cone, with a mounting that straddles the mole run. A counting device registers each passing of a mole and is used to direct trapping.

Zappa-Mole—This device incorporates the counta-mole device with a device to trigger a pulse of electricity to kill the mole.

The invention also includes a method of detecting and destroying subterranean animals. The method includes providing a heat sensing, infrared detector device adapted for detecting an animal below the ground surface from above the ground surface. A lethal event device is provided that is operatively coupled to the infrared detector device. An animal passing below ground is detected with the above ground infrared detector, and the lethal event device is actuated to destroy the animal below ground.

Figure 12:
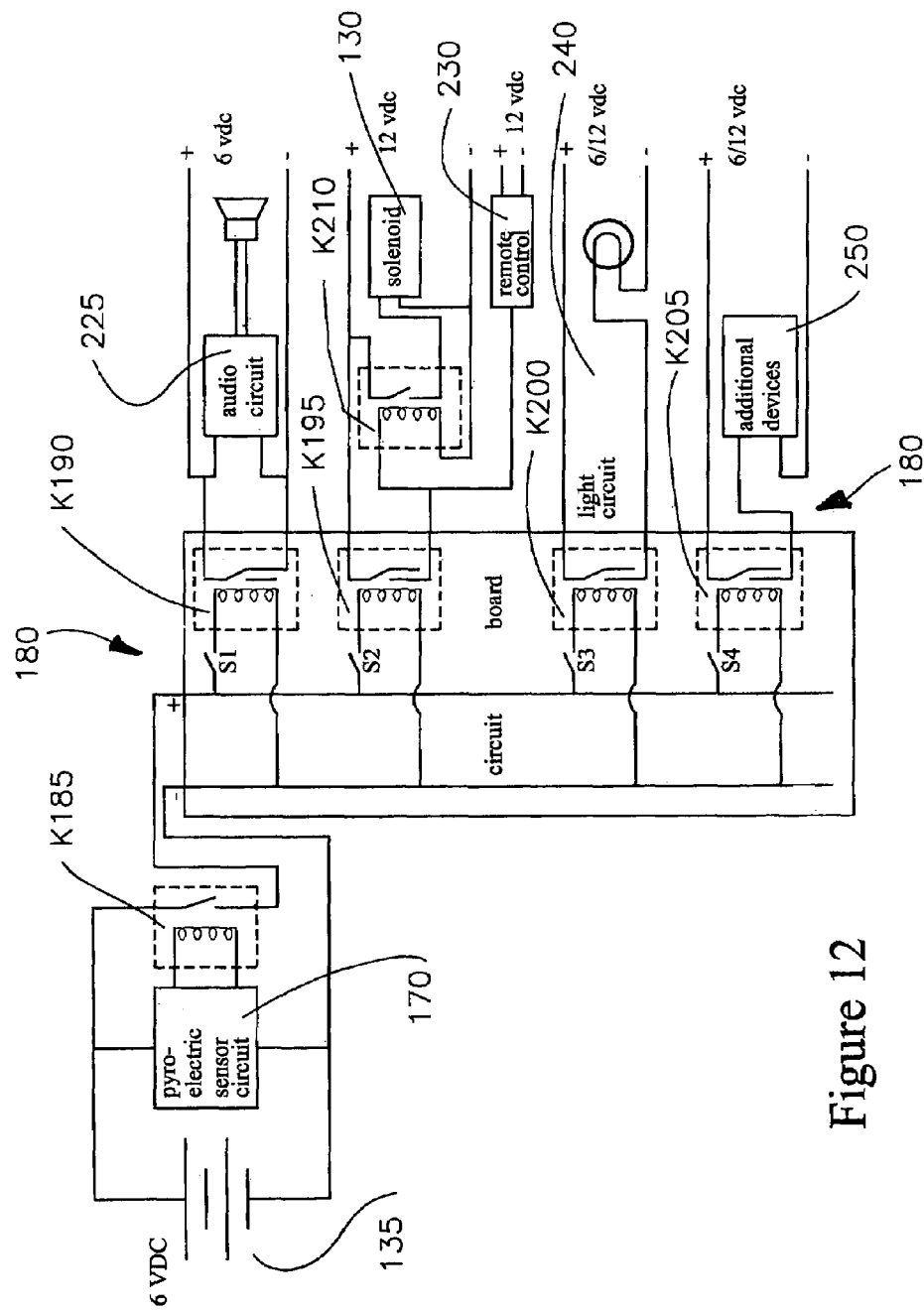
FIG. 12 is a schematic diagram of additional circuitry used to control the infrared sensing/lethal event system of the another embodiment of the present invention.

Referring now to FIG. 1, a cross sectional view of one embodiment of an assembly including a lethal event device operatively coupled to a heat sensing, infrared detector device of the present invention is shown. In FIG. 1, the animal A, such as a mole, has established a subterranean run R below ground level G. The run is often manifested by a raising of the ground above the run R. A detector/lethal event system 10 is positioned above ground level G and over the run R. The system 10 includes a heat sensing, infrared detector device 20 powered by a suitable power source, such as batteries 135 (FIG. 12). The infrared detector device 20 is operatively connected to a lethal event device 40 by a suitable control line 30. The lethal event device 40 can be any device capable of killing the subterranean animal A. One embodiment of the lethal event device 40, illustrated in FIG. 1, is a spring-loaded mechanical device 50, that thrusts a plurality of linear spike members 65 into the ground to destroy the mole A. The spring-loaded mechanical device 50 includes a framework member 55 having a vertical rod member 60 slidably positioned therein. The rod member 60 contains a plurality of linear spike members 65 at a bottom end thereof, and a biasing spring member 70 encircling a top end of the rod member 60. A trigger member 75 secured to the framework member 55 engages the rod member 60 with the biasing spring member 70 in a compressed condition, as illustrated in FIG. 1. The heat sensing, infrared detector device 20 is operatively coupled to the trigger member 75 by a control line 30. One heat sensing, infrared detector device 20 found to be particularly suitable for the detector/lethal event system 10 is the GLMDA motion detector device available from Glolab Corp., Wappingers Falls, N.Y. The mole A in the run R below ground level G, passing the above ground, heat sensing, infrared detector device 20, causes the detector device 20 to actuate the trigger member 75 via the control line 30. The trigger member 75 releases the rod member 60 and expansion of the compressed, biasing spring member 70 drives the plurality of spike member 65 attached to the rod member 60 into the below ground run R, thereby destroying the mole A there beneath.

The spring-loaded mechanical device 50 is but one example of a lethal event device 40 that is actuated by the heat sensing, infrared device 20 to eliminate the animal A. The lethal event device 40 can include a device for delivering a lethal electrical shock to the animal A in the run, or the device 40 can be an explosive charge which detonates within the run R to destroy the animal A.

Figure 2:
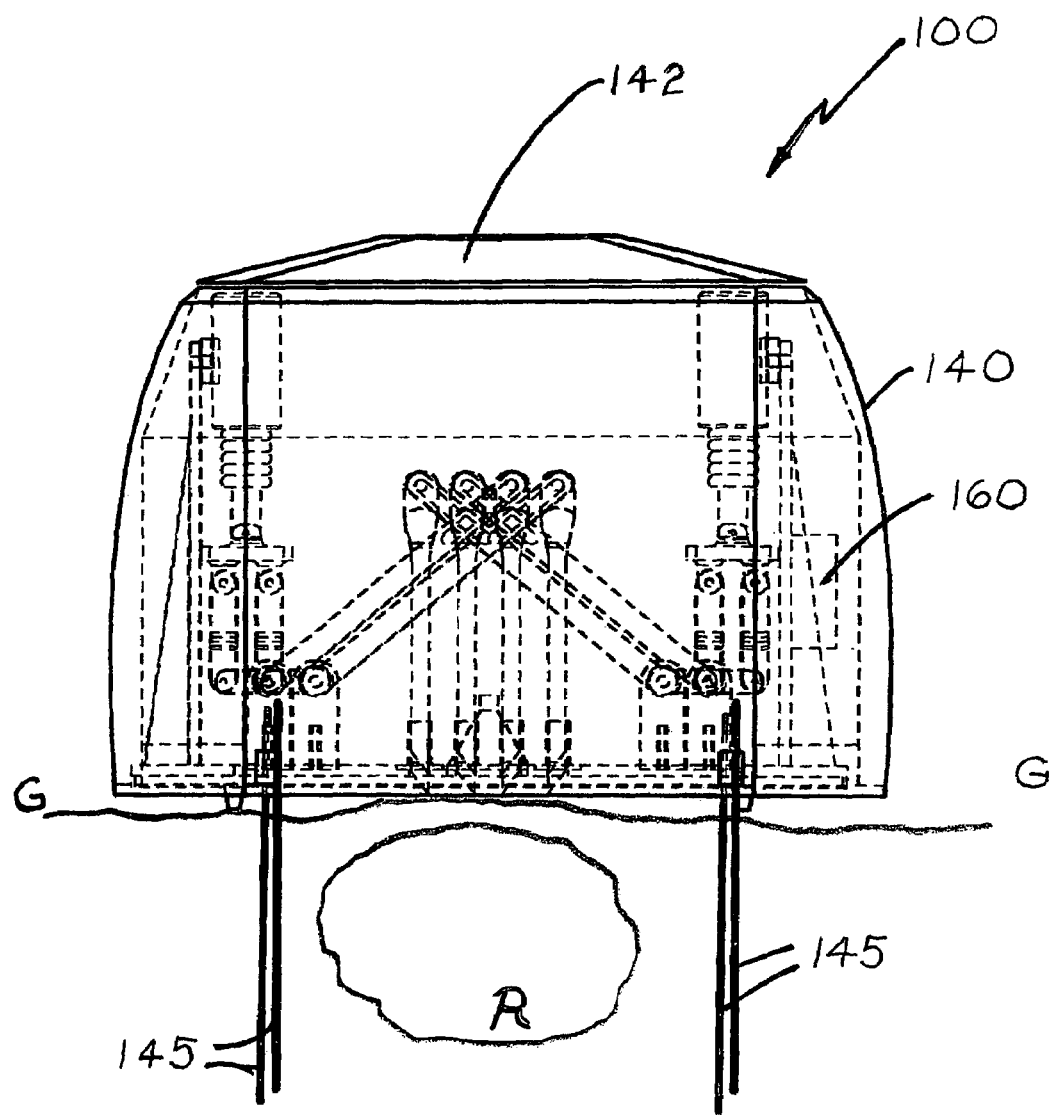
FIG. 2 is a side plan view of another embodiment of the lethal event device of the present invention straddling an underground run of a subterranean animal.
Figure 3:
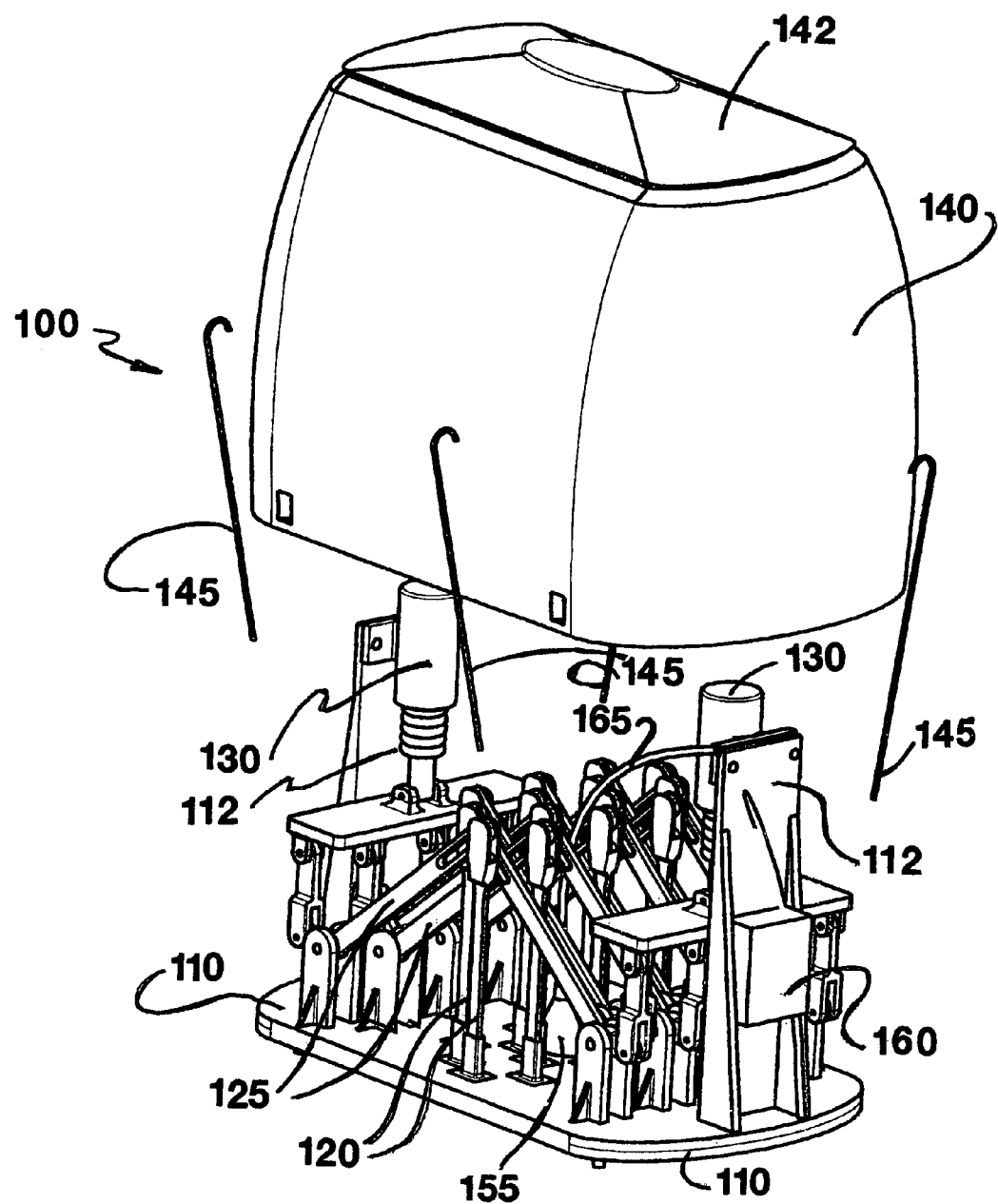
FIG. 3 is an exploded perspective view of the lethal event device of the another embodiment of the present invention.

Referring now to FIGS. 2–11, another embodiment of the detector/lethal event system 100 is illustrated. FIG. 2 shows an electrically powered, detector/lethal event system 100 positioned above ground level G and over the run R of the subterranean animal A. FIG. 3 provides an exploded perspective view of the electrically powered, detector/lethal event system 100 of the present invention.

Figure 4:
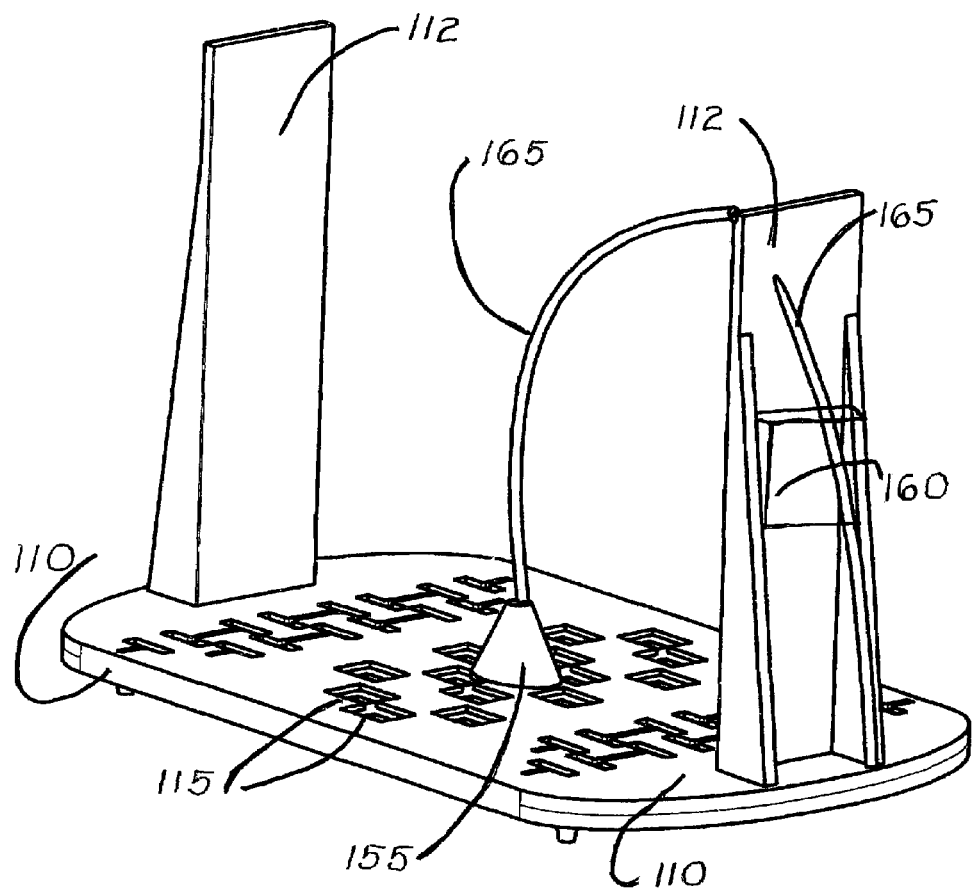
FIG. 4 is a perspective view of the base member with the heat sensing infrared detector device positioned thereon of the another embodiment of the lethal event device of the present invention.

Referring now to FIG. 4, the electrically powered, detector/lethal event system 100 includes a planar base member 110 having a plurality of centrally positioned apertures 115 therein, and a pair of opposed upright supports 112 mounted at opposite edges of the base member 110. The base member 110 includes a central aperture 150 therein (FIG. 7), adapted for positioning a heat sensing, infrared detector element 155 to detect a subterranean animal there beneath. The detector element 155 is connected to an electronics and power supply module 160, mounted on one of the upright supports 112, by a conductor cable 165. One heat sensing, infrared detector device 155, 160 found to be particularly suitable for the detector/lethal event system 100 is the GLMDA motion detector device available from Glolab Corp., Wappingers Falls, N.Y.

Figure 5:
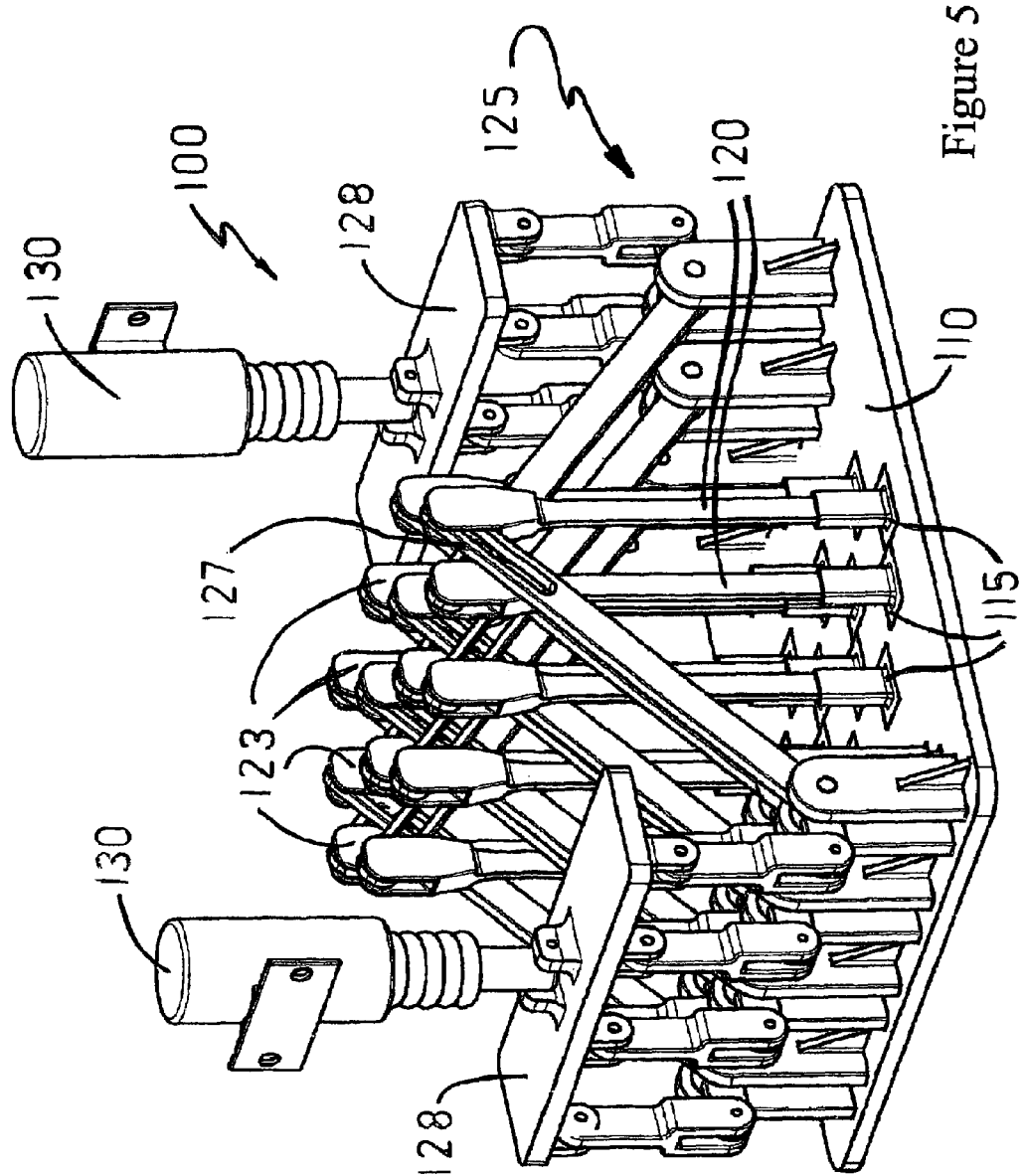
FIG. 5 is a perspective view of the base member, mechanical linkage and spike members of the another embodiment of the lethal event device of the present invention.
Figure 6:
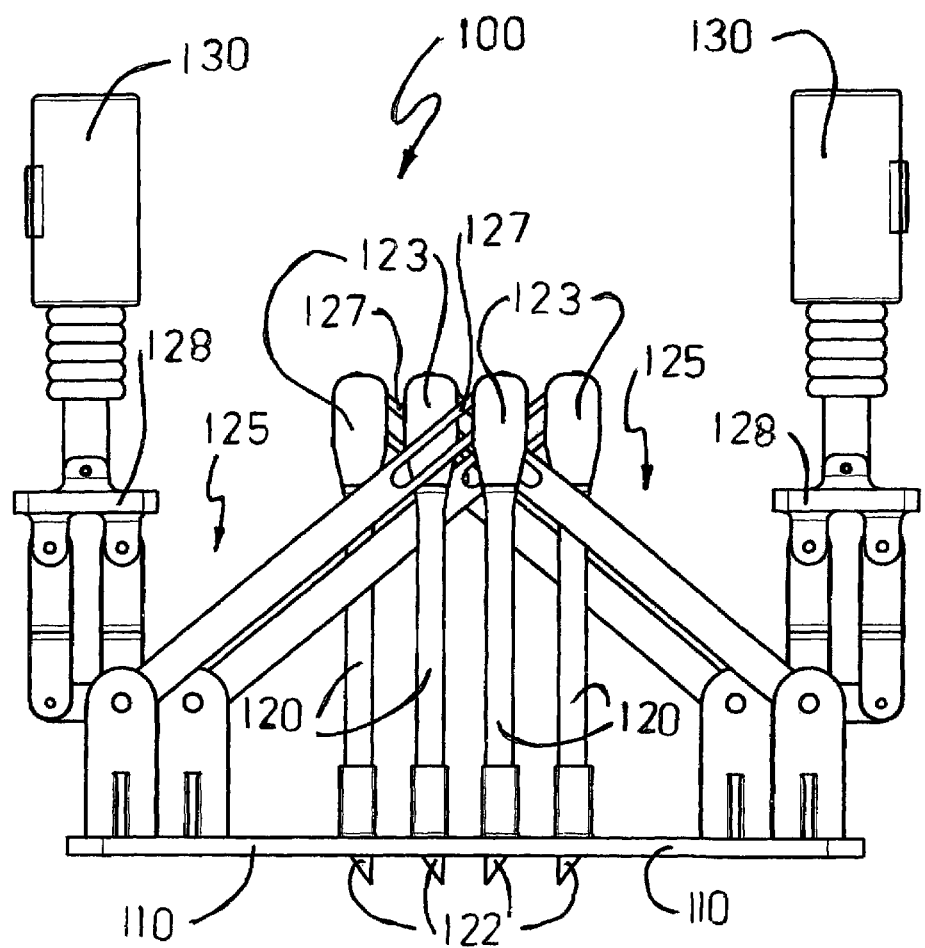
FIG. 6 is a side view of the base member, mechanical linkage and spike members of the another embodiment of the lethal event device of the present invention.
Figure 7:
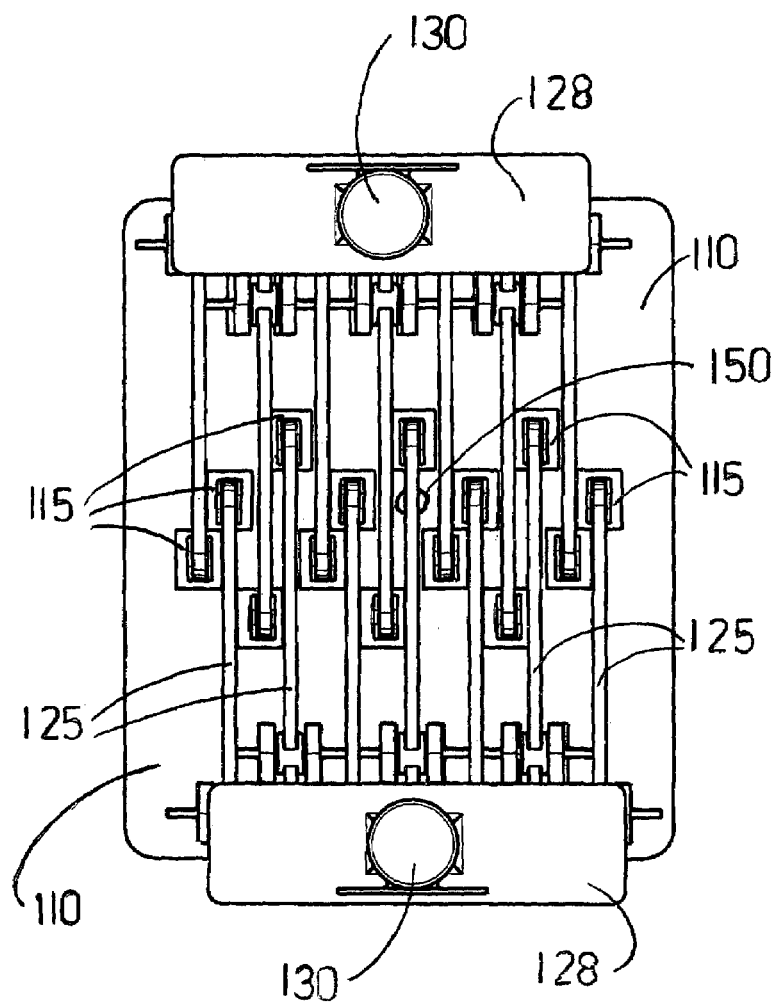
FIG. 7 is a top view of the base member, mechanical linkage and spike members of the another embodiment of the lethal event device of the present invention.
Figure 8:
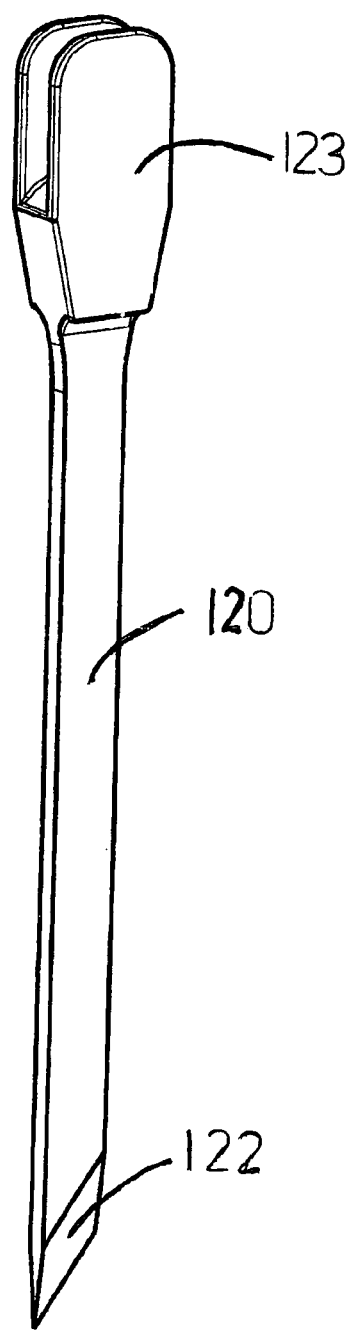
FIG. 8 is a perspective view of the linear spike member of the lethal event device of the another embodiment of the present invention.
Figure 9:
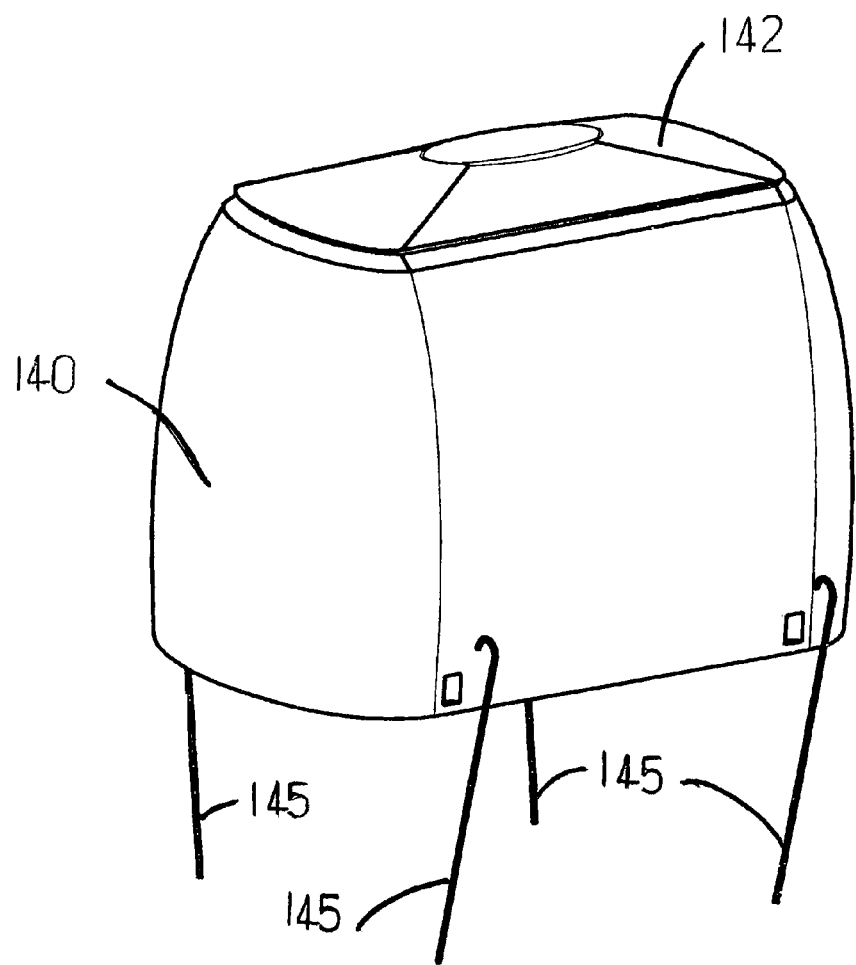
FIG. 9 is a perspective view of the shroud member with the anchor members secured thereto of the lethal event device of the another embodiment of the present invention.
Figure 10:
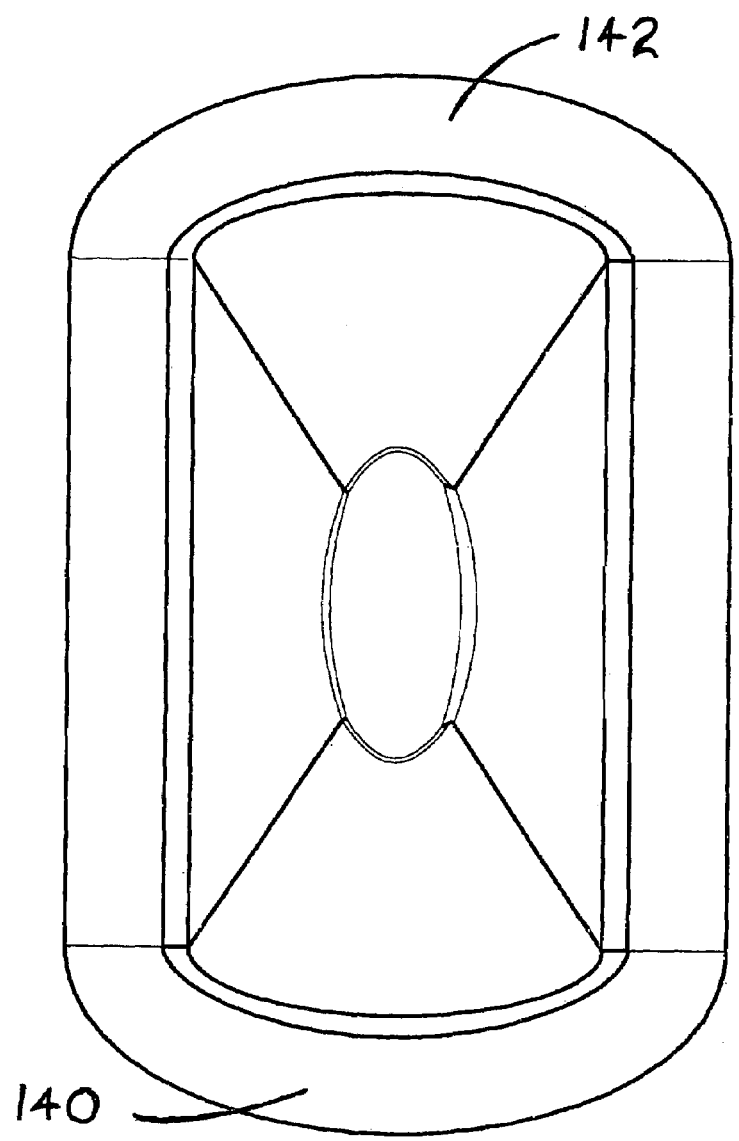
FIG. 10 is a top view of the shroud member of the lethal event device of the another embodiment of the present invention.

As illustrated in FIGS. 5–7, a plurality of linear spike member 120 is present, each having a pointed end 122 and a connector end 123. Each spike member 120 is slidably mounted within a centrally positioned aperture 115 of the base member 110. A mechanical linkage 125 is secured at a linkage first end 127 to the connector end 123 of a linear spike member 120, opposite the base member 110, and to the base member 110 adjacent a peripheral edge thereof, and at a linkage second end 128 to a solenoid member 130. A power source, in the form of a battery 135, is present in the control module 160 for providing electrical power to the infrared detector element 155 and the associated electronic circuitry 170 housed within the control module 160, as well as to the solenoid members 130.

As illustrated in FIG. 3, the solenoid members 130 are each mounted to one of the upright supports 112 secured at opposite sides of the base member 110, with the solenoids members 130 operatively connected to the control module 160. Thus, an animal A, detected below ground G by the infrared detector element 155 and associated electronic circuitry 170, actuates both solenoid members 130 to drive the linear spike members 120 into the animal's run R to destroy the subterranean animal A therein.

A shroud member 140 is secured to the base member 110, the shroud member 140 enclosing the plurality of linear spike members 120, the mechanical linkage 125 and the solenoid member 130, with the solenoid members 130 secured to the upright supports 112 of the base member 110. An access cover 142 is located at the top of the shroud member 140, allowing access to the internal mechanism of the detector/lethal event system 100. A plurality of anchor members 145 are secured to the shroud member 140 and are adapted for anchoring the detector/lethal event system 100 to a ground surface, as illustrated in FIG. 2.

Figure 11:
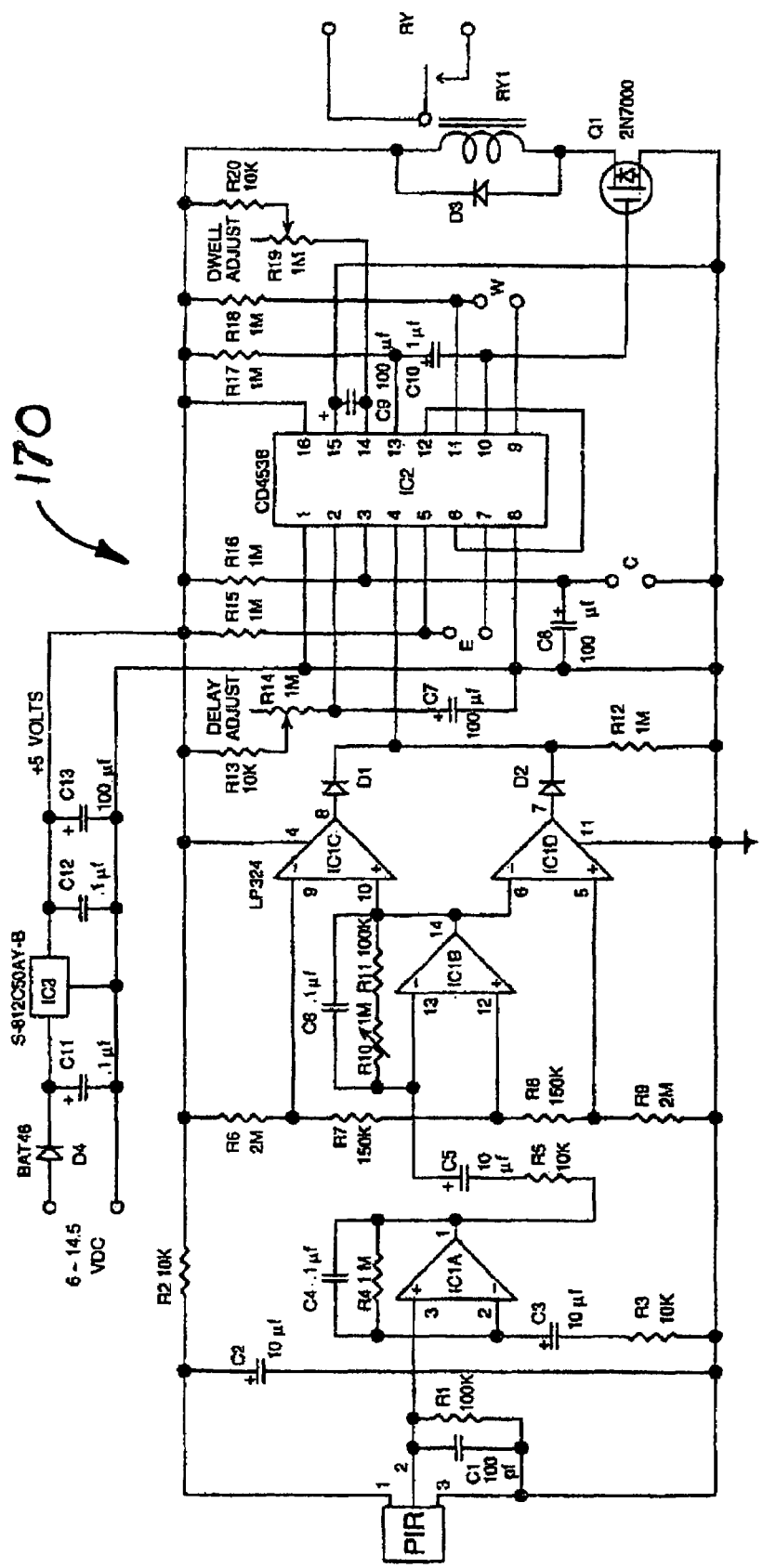
FIG. 11 is a schematic diagram of the circuitry used to connect the infrared sensing device to the lethal event device of the another embodiment of the present invention.

One heat sensing, infrared detector device 155, 160 found to be particularly suitable for the detector/lethal event system 100 is the GLMDA motion detector device available from Glolab Corp., Wappingers Falls, N.Y. FIG. 11 is a schematic of the electronic circuitry 170 for that particular infrared detector device 155, 160 employed in the detector/lethal event system 100 of the present invention. FIG. 12 provides a schematic representation of additional components operatively connected to the circuitry 170 of the infrared detector device 155, 160, shown in FIG. 11, to provide functions beyond simply activating the lethal event device of the system 100. FIG. 12 shows a series of relays 180 that control the further embodiment of the detector/lethal event system 100 of the present invention. When a moving, infrared heat source, such as a mole A, is detected by the infrared sensor element 155 and associated sensor circuitry 170, a voltage is generated that closes relay K185, which is normally open. This signal continues to a circuit board containing additional relays (K190–K205, . . . Kn). Manual switches (S1–S4) are opened and closed by the user to control the functions that are to be activated by the infrared sensor element 155 and associated infrared sensor circuitry 170 (e.g. the audio circuit 225 will not function if switch S1 is left open). If switch S2 is closed, and the infrared sensor 155 detects a heat source, the corresponding voltage closes relay K195, which immediately closes relay K210, activating the solenoid members 130, thus operating the mechanical linkages 125 and driving the linear spike members 120 into the ground to destroy the mole A. If the user chooses, switch S2 is left open, thus disabling activation of the solenoid members 130 via the infrared sensor 155 and associated infrared sensor circuitry 170. In this mode of operation, the solenoid members 130 can be activated via a remote control circuit 230 in communication with a remote control switch operated by the user. The presence of a mole A beneath the detector/lethal event system 100 can provide an audio signal from the audio circuit 225, or a visual signal from the light circuit 240, with the user activating the lethal event device by means of the remote control circuit 230 with the remote control switch, thereby closing relay K210, to actuate the solenoid members 130, as described above.

In a further embodiment of the invention, additional devices are connected to relay K205 to provide additional functionality for the detector/lethal event system 100. For example, a counting circuit 250 is designed to accumulate a record of each occurrence of a mole A being detected by the heat sensing, infrared detector device 155, 160. In this mode of operation, switch S2 is open, switch S4 closed, and switches S1 and S3 either open or closed. With the counting circuit 250 operational, the user can obtain an estimate of the mole population in a particular area.

The descriptions above and the accompanying materials should be interpreted in the illustrative and not the limited sense. While the invention has been disclosed in connection with the preferred embodiment or embodiments thereof, it will be understood by those skilled in the art that various changes in form and details may be made therein without departing from the spirit and scope of the invention.

We claim:

1. A lethal event device adapted for mounting above a ground surface and for destroying subterranean animals comprising:

a planar base member having a plurality of centrally positioned apertures therein, and a pair of opposed upright supports mounted at opposite edges of the base member;

a plurality of linear spike members, each spike member slidably mounted within one of said centrally positioned base member apertures;

a mechanical linkage secured at a first end to an end of one of the linear spike members opposite the base member, and to the base member adjacent a peripheral edge thereof, and at a second end to a solenoid member;

a power source for providing electrical power to the solenoid member and adapted for powering an infrared detector device, the solenoid member secured to one of the upright supports of the base member;

a shroud member secured to the base member and enclosing the plurality of linear spike members, the mechanical linkage and the solenoid member;

a plurality of anchor members secured to the solenoid member and adapted for anchoring the lethal event device to a ground surface; and the base member including a central aperture therein adapted for positioning a heat sensing, infrared detector device to detect a subterranean animal there beneath, the infrared detector device actuating the solenoid member, causing the plurality of linear spike members to penetrate the ground surface beneath the base member to destroy the subterranean animal there beneath.

2. The lethal event device adapted for mounting above a ground surface and for destroying subterranean animals of claim 1, wherein the mechanical linkage between the one of the linear spike members and the solenoid member is a four-bar linkage.

3. The lethal event device adapted for mounting above a ground surface and for destroying subterranean animals of claim 1, wherein the power source is a battery.

4. The lethal event device adapted for mounting above a ground surface and for destroying subterranean animals of claim 1, further including an infrared detector device positioned interior the shroud member.

5. The lethal event device adapted for mounting above a ground surface and for destroying subterranean animals of claim 4, wherein the infrared detector device includes circuitry to generate a cumulative event count for each occurrence of sensing an animal by the infrared detector device.

6. The lethal event device adapted for mounting above a ground surface and for destroying subterranean animals of claim 4, wherein the infrared detector device includes circuitry to generate a visual signal upon sensing an animal by the infrared detector device and circuitry to actuate the lethal event device by a remote control device.

7. A system for detecting and destroying subterranean animals comprising:
   a heat sensing, infrared detector device adapted to detect animals below a ground surface from above the ground surface; and
   a lethal event device positioned above the ground surface and operatively coupled to the heat sensing, infrared detector device, the lethal event device including:
      a planar base member having a plurality of centrally positioned apertures therein, and a pair of opposed upright supports mounted at opposite edges of the base member;
      a plurality of linear spike members, each spike member slidably mounted within one of said centrally positioned base member apertures;
      a mechanical linkage secured at a first end to an end of one of the linear spike members opposite the base member, and to the base member adjacent a peripheral edge thereof, and at a second end to a solenoid member, the solenoid member secured to one of the upright supports of the base member;
      a power source for providing electrical power to the infrared detector device and to the solenoid member;
      a shroud member secured to the base member and enclosing the plurality of linear spike members, the mechanical linkage and the solenoid member;
      a plurality of anchor members secured to the shroud member and adapted for anchoring the lethal event device to a ground surface; and
      the base member including a central aperture therein adapted for positioning the heat sensing, infrared detector device to detect a subterranean animal there beneath, whereby an animal below ground, passing the above ground, heat sensing, infrared detector device, actuates the lethal event device, thereby causing the plurality of linear spike members to penetrate the ground surface to destroy the animal there beneath.

8. The system for detecting and destroying subterranean animals of claim 1, wherein the mechanical linkage between the one of the linear spike members and the solenoid member is a four-bar linkage.

9. The system for detecting and destroying subterranean animals of claim 1, wherein the power source is a battery.

10. The system for detecting and destroying subterranean animals of claim 1, wherein the infrared detector device is positioned interior the shroud member.

11. The system for detecting and destroying subterranean animals of claim 1, wherein the infrared detector device includes circuitry to generate a cumulative event count for each occurrence of sensing an animal by the infrared detector device.

12. The system for detecting and destroying subterranean animals of claim 1, wherein the infrared detector device includes circuitry to generate a visual signal upon sensing an animal by the infrared detector device and circuitry to actuate the lethal event device by a remote control device.

13. A system for detecting and destroying subterranean animals comprising:
   a heat sensing, infrared detector device adapted to detect animals below a ground surface from above the ground surface; and
   a lethal event device positioned above the ground surface and operatively coupled to the heat sensing infrared detector device, the lethal event device including:
      a planar base member having a plurality of centrally positioned apertures therein, and a pair of opposed upright supports mounted at opposite edges of the base member;
      a plurality of linear spike members, each spike member slidably mounted within one of said centrally positioned base member apertures;
      a mechanical linkage secured at a first end to an end of one of the linear spike members opposite the base member, and to the base member adjacent a peripheral edge thereof, and at a second end to a solenoid member, the solenoid member secured to one of the upright supports of the base member;
      a power source for providing electrical power to the infrared detector device and to the solenoid member;
      a shroud member secured to the base member and enclosing the plurality of linear spike members, the mechanical linkage and the solenoid member;
      a plurality of anchor members secured to the shroud member and adapted for anchoring the lethal event device to a ground surface; and
      the base member including a central aperture therein adapted for positioning the heat sensing, infrared detector device to detect a subterranean animal there beneath, the infrared detector device actuating the solenoid member, causing the plurality of linear spike members to penetrate the ground surface beneath the base member to destroy the subterranean animal there beneath.

14. The system for detecting and destroying subterranean animals of claim 13, wherein the infrared detector device includes circuitry to generate a cumulative event count for each occurrence of sensing an animal by the infrared detector device.

15. The system for detecting and destroying subterranean animals of claim 13, wherein the infrared detector device includes circuitry to generate a visual signal upon sensing an animal by the infrared detector device and circuitry to actuate the lethal event device by a remote control device.

* * * * *

UNITED STATES PATENT AND TRADEMARK OFFICE
CERTIFICATE OF CORRECTION

| | | |
|---|---|---|
| PATENT NO. | : 7,076,913 B1 | Page 1 of 1 |
| APPLICATION NO. | : 11/148636 | |
| DATED | : July 18, 2006 | |
| INVENTOR(S) | : Dow et al. | |

It is certified that error appears in the above-identified patent and that said Letters Patent is hereby corrected as shown below:

In claim 8, at column 9, line 58: Delete "claim 1" and insert therefore --claim 7--.

In claim 9, at column 9, line 62: Delete "claim 1" and insert therefore --claim 7--.

In claim 10, at column 10, line 2: Delete "claim 1" and insert therefore --claim 7--.

In claim 11, at column 10, line 5: Delete "claim 1" and insert therefore --claim 7--.

In claim 12, at column 10, line 10: Delete "claim 1" and insert therefore --claim 7--.

Signed and Sealed this

Twenty-third Day of October, 2007

JON W. DUDAS
*Director of the United States Patent and Trademark Office*